United States Patent [19]

Curry et al.

[11] 4,347,922
[45] Sep. 7, 1982

[54] GRAIN DISTRIBUTOR ASSEMBLY FOR GRAIN ELEVATOR

[75] Inventors: Robert D. Curry, Decatur; Richard C. Larson, Chicago; Merle E. Clewett, Clinton, all of Ill.

[73] Assignee: Union Iron Works, Inc., Warrensburg, Ill.

[21] Appl. No.: 201,010

[22] Filed: Oct. 27, 1980

[51] Int. Cl.³ .............................................. B65G 11/00
[52] U.S. Cl. ..................................................... 193/23
[58] Field of Search ................... 193/15, 23; 222/533; 406/117, 118, 164, 165; 141/67, 93

[56] References Cited

U.S. PATENT DOCUMENTS

| | | | |
|---|---|---|---|
| 2,756,859 | 7/1956 | Steffen et al. | 193/23 |
| 3,339,691 | 9/1967 | Schlagel et al. | 193/23 |
| 3,827,578 | 8/1974 | Hough | 193/23 X |
| 3,874,490 | 4/1975 | McAlister | 193/23 |

*Primary Examiner*—Andres Kashnikow
*Assistant Examiner*—Gene A. Church
*Attorney, Agent, or Firm*—Leydig, Voit, Osann, Mayer & Holt, Ltd.

[57] ABSTRACT

A grain distributor assembly for a grain elevator which includes a manifold plate having a plurality of discharge openings connected to respective downspouts. A distributor elbow having an inlet at its upper end coaxial with the central axis, and an offset outlet at its lower end, is arranged to discharge into any one of the discharge openings. Mounted below the elbow and swingable with it is a closure disc seated upon the manifold plate and having a single window therein providing passage for the lower end of the elbow. The remainder of the disc seats upon and closes off the inactive, non-registering ones of the discharge openings. A selector is provided for swinging the closure disc and elbow in unison about the central axis for positioning the elbow and window in angular register with a selected one of the discharge openings while maintaining all the other such openings securely covered. The disc, mounted for slight vertical movement, is sufficiently weighty so that it remains seated in position to serve as a fire stop in the face of an explosion either at the distributor inlet or in an inactive one of the downspouts. A sleeve at the lower end of the elbow is movable between a downwardly extended position and a retracted position. A lock holds the sleeve temporarily in its extended position. A manually controlled operator is connected to the lock, to the sleeve and to the disc for (a) releasing the lock, (b) retracting the sleeve, and (c) elevating the disc clear of the manifold plate to facilitate swinging the disc and elbow to a new discharge position.

19 Claims, 12 Drawing Figures

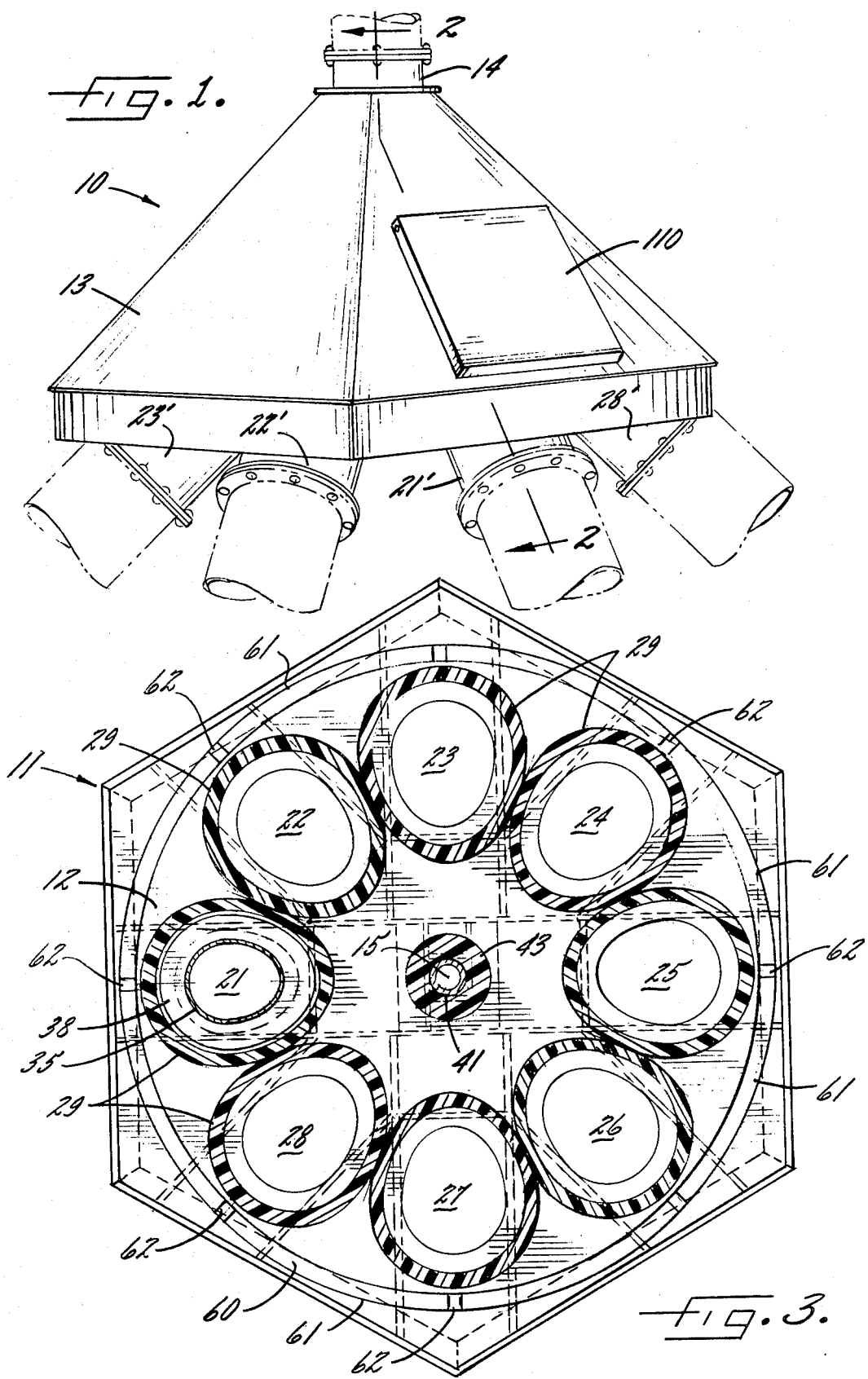

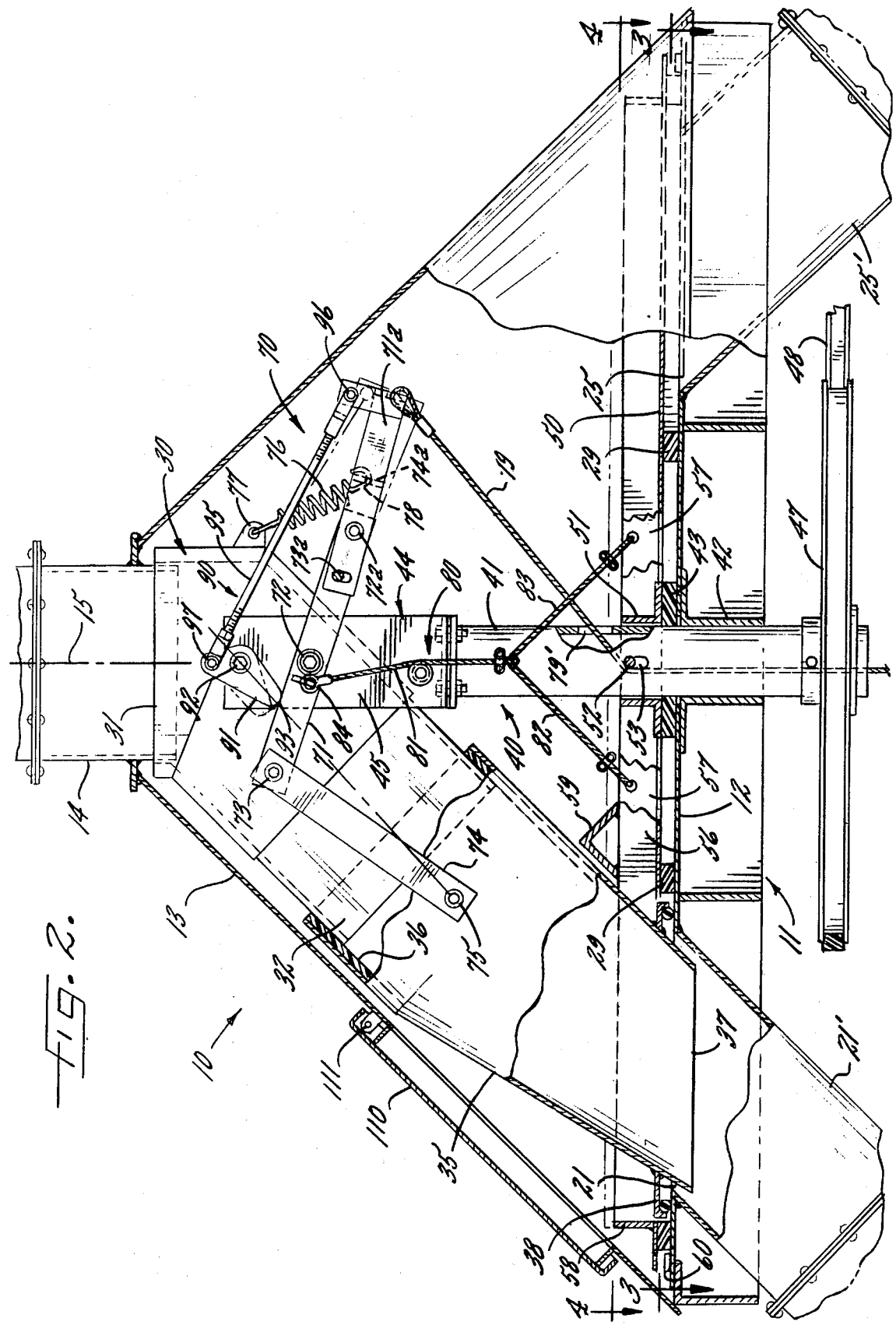

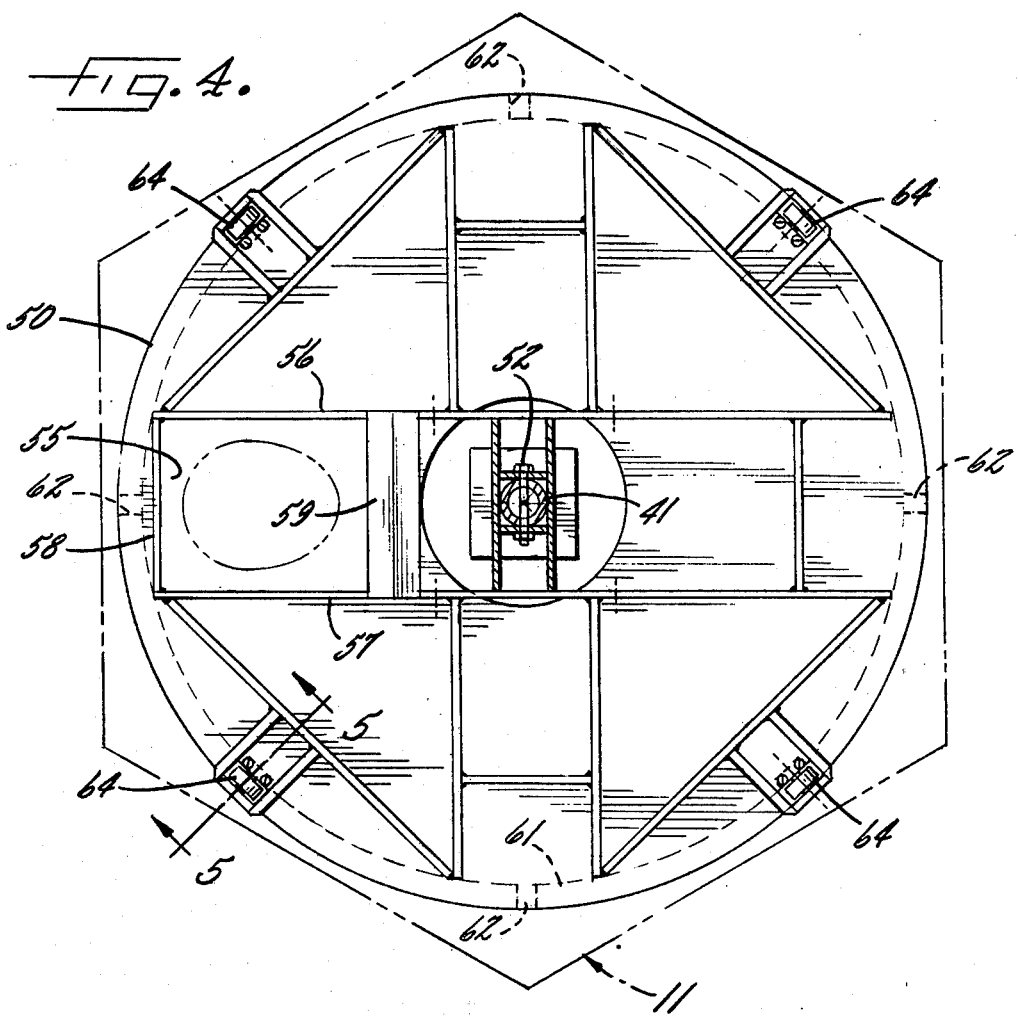
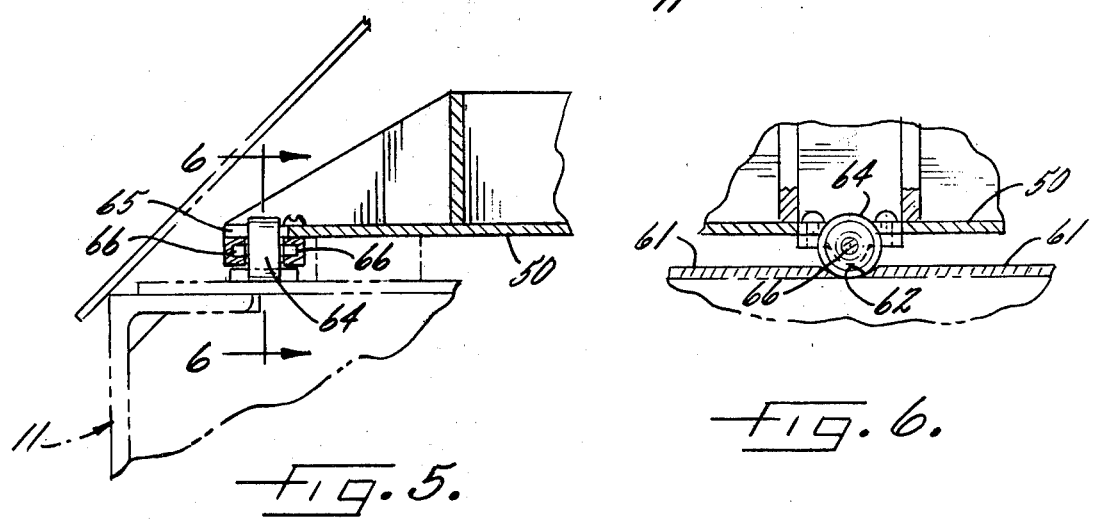

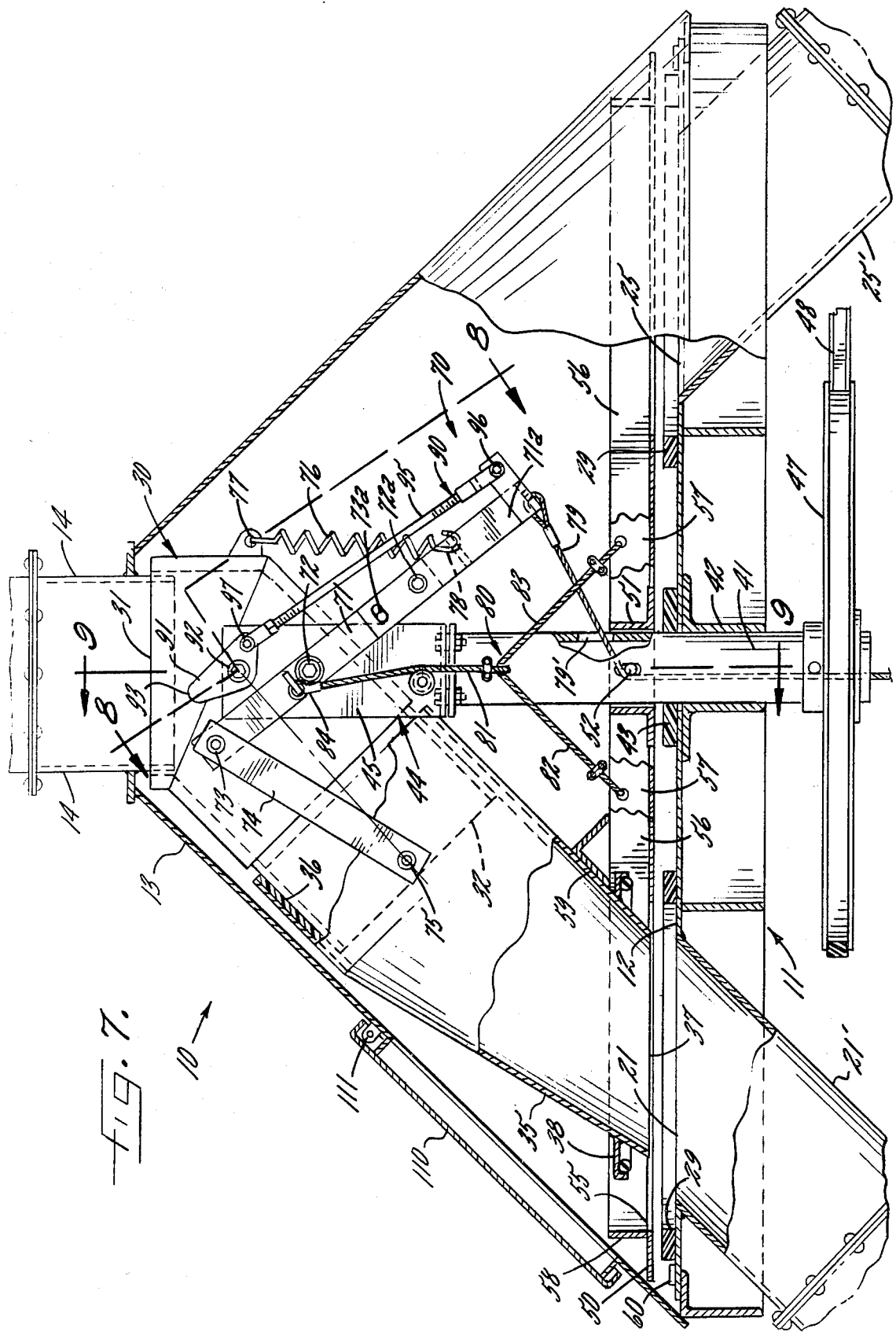

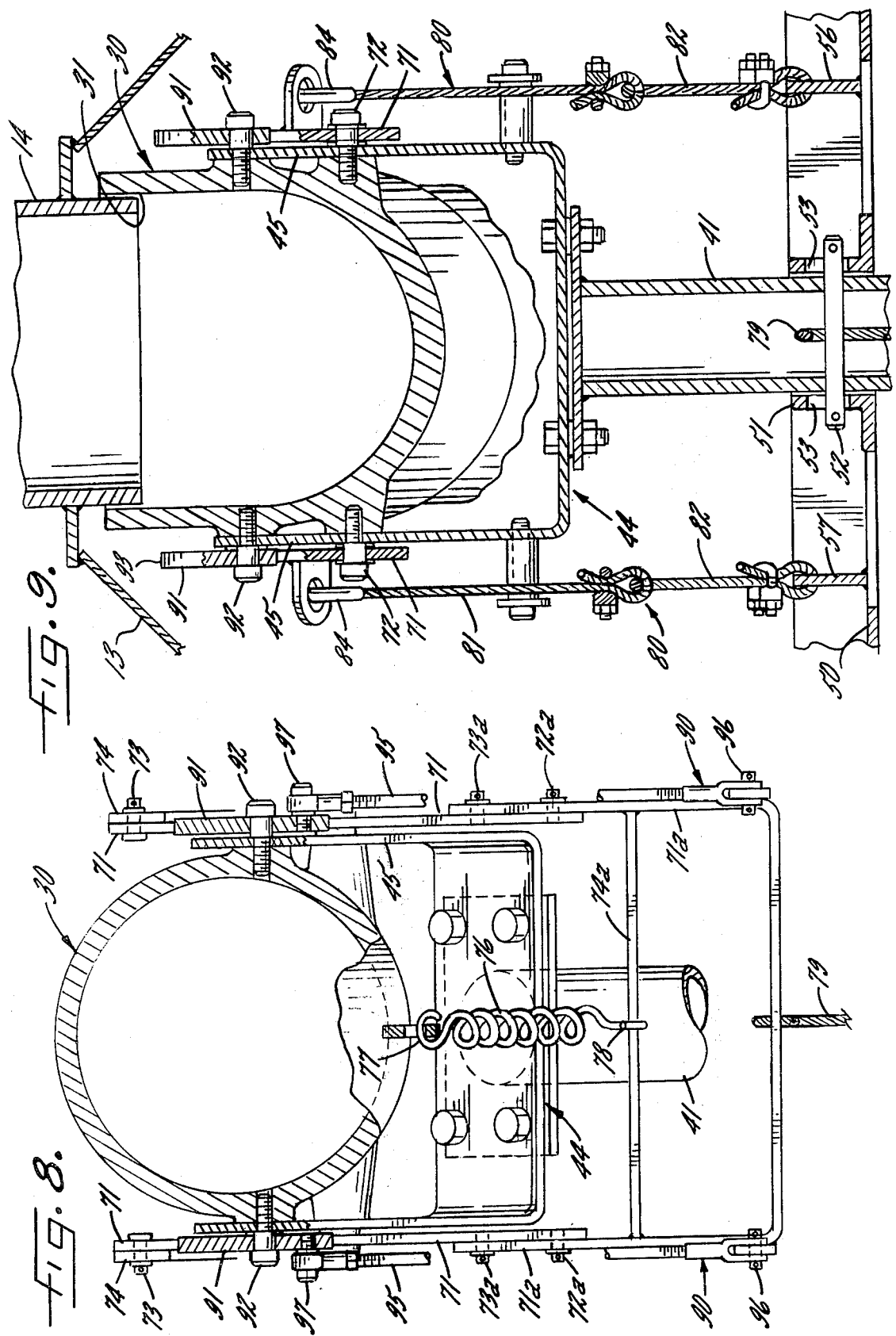

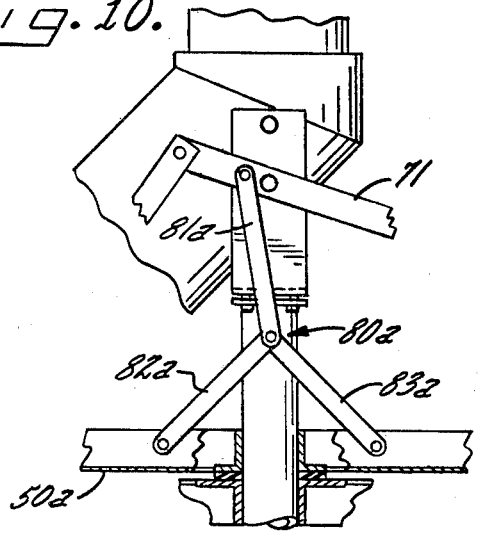
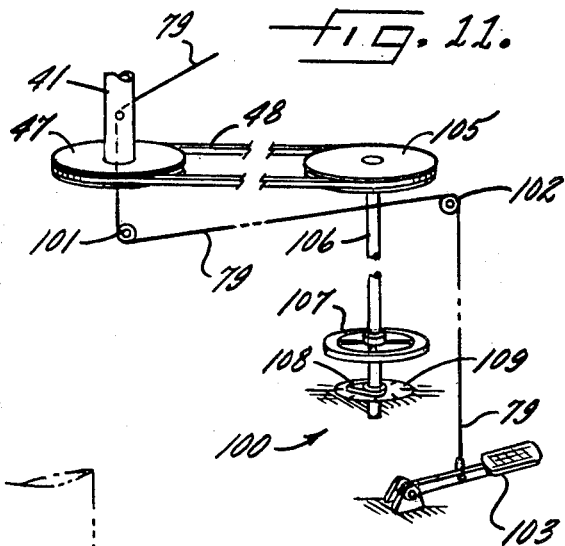
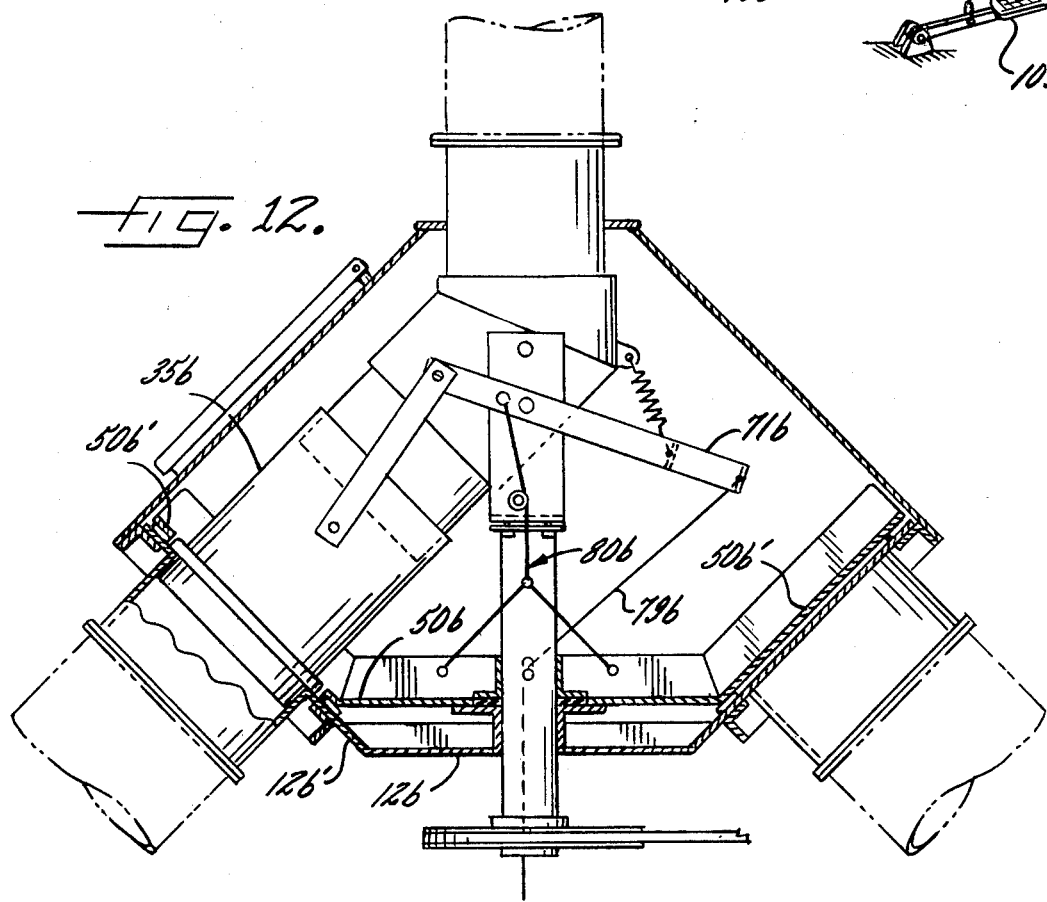

GRAIN DISTRIBUTOR ASSEMBLY FOR GRAIN ELEVATOR

The standard grain distributor not only serves as a distribution center for grain but also as a prompt and effective means for distributing a fire.

Upon ignition of a fire in a bucket elevator supplying the distributor, a "fire ball" may explosively pass from the elevator to the distributor, and there is nothing to keep that fire ball from feeding down the spouts of the distribution system to all of the other areas of the facility, the bins, tanks, hoppers, etc. Conversely if a fire occurs downstream of the distributor, for example, in one of the inactive downspouts, a fire ball may travel up the spout into the center of the distributor and right back down each of the other distributor spouts. Thus the fire or explosion, which shall be considered to be synonymous terms, originating either in the elevator or at some remote location, may be conducted disastrously throughout the entire plant.

It has been proposed to employ, as a dust barrier, an annulus formed of a layer of plastic material for covering the discharge openings of a distributor while having a window therein for communicating with the distributor spout, the annulus being held in its seated position by creating a slight positive pressure in the distributor housing. While this prevents free passage of dust between the inactive downspouts, should an explosion occur in one of the downspouts it unseats the dust barrier so that it is possible for the explosion to pass downwardly through the other inactive downspouts for propagation to other parts of the plant.

It is an object of the invention to provide a distributor which incorporates a novel fire stop so that a fire in one portion of the plant cannot spread to, or affect, other parts of the plant via the distributor. It is a more specific object of the invention to provide, in a distributor, a weighty closure disc which is secured to, and rotatable with, the distributor elbow, the disc having a single window to accommodate the elbow for passage of grain to the selected discharge opening while serving as a secure closure for all of the inactive ones of the discharge openings.

It is a related and more specific object to provide, in such a structure, a closure disc which seats on the manifold plate which defines the discharge openings but which includes provision for elevating the disc clear of the manifold plate to facilitate swinging of the disc and elbow to a new discharge position.

In one of the aspects of the invention it is an object to provide a more secure connection between the distributor elbow and the selected discharge opening, such connection being in the form of a telescoping sleeve which, during discharge, is extended downwardly through the registering downspout but which is retractable upwardly to permit rotation to a new position.

In one of the still further aspects of the invention it is an object to provide a lock for locking the sleeve in its extended position until intentionally retracted. In this connection it is a more detailed object to provide an operator movable between a rest position and an actuated position for (a) releasing the lock, (b) retracting the sleeve and (c) raising the disc clear of the manifold plate, with reversal of these functions after the elbow and disc have reached a new angular position.

It is a general object to provide a distributor which, in addition to efficiently performing its distribution function, serves as a constantly active and reliable fire stop in all of its positions and which is, in addition, highly economical, simply constructed and easily maintained.

Other objects and advantages of the invention will become apparent upon reading the attached detailed description and upon reference to the drawings in which:

FIG. 1 is an elevational view of a grain distributor constructed in accordance with the present invention with its cover in place.

FIG. 2 is a vertical section taken through the distributor along line 2—2 of FIG. 1.

FIG. 3 is a horizontal section looking along line 3—3 of FIG. 2 and providing a plan view of the manifold plate.

FIG. 4 is a horizontal section taken along line 4—4 in FIG. 2 and providing a plan view of the closure disc.

FIG. 5 is an enlarged fragmentary section looking along line 5—5 in FIG. 4 and showing, in elevation, one of the roller bearings.

FIG. 6 is an enlarged fragmentary section looking along line 6—6 in FIG. 5 and showing a roller bearing, and its receiving notch, in profile.

FIG. 7 is a fragmentary section similar to FIG. 2 but showing the sleeve retracted and the disc raised in readiness for swinging by the selector, to a new angular position.

FIG. 8 is an enlarged fragmentary section of the structure of FIG. 7 as viewed along line 8—8 therein.

FIG. 9 is an enlarged vertical section taken along line 9—9 in FIG. 7.

FIG. 10 is a fragmentary view patterned after FIG. 2 but including a rigid linkage for achieving positive holddown of the closure disc.

FIG. 11 is a diagram showing the selector and operator at a remote control station.

FIG. 12 is a view similar to FIG. 2 but showing a modified construction employing a conical closure disc in lieu of a flat closure disc.

While the invention has been shown and described in connection with certain preferred embodiments, it will be understood that we do not intend to be limited to the particular embodiments but intend, on the contrary, to cover the various alternative and equivalent constructions included within the spirit and scope of the appended claims.

Turning now to the drawings there is disclosed, in FIGS. 1-4, a distributor assembly 10 having a frame 11 which includes a manifold plate 12 which, in the present instance, is of hexagonal shape with a correspondingly profiled pyramidal cover or housing 13 having at its top a flanged inlet tube 14 arranged coaxially with a central axis 15.

Formed in the manifold plate, and spaced in a circle at a constant radius about the central axis 15 are a plurality of discharge openings 21-28, each opening being surrounded by a land having a resilient annular gasket 29 and each opening having an associated downspout connection, indicated by a corresponding primed number, under the plate. A typical downspout, which may lead to a storage bin, hopper or the like has been indicated in phantom.

Arranged above the manifold plate is a distributor elbow 30 having an inlet 31 at its upper end which mates with the inlet tube 14, and an outlet 32 at its lower end for selectively discharging into the discharge openings 21-28. Telescoped over the lower end of the distributor elbow is a sleeve 35, the space between the sleeve and the elbow being occupied by an annular gasket 36 which is preferably formed of polyethylene, teflon or other slippery material. The sleeve has a projecting end 37 surrounded by a locator plate 38. The function of the plate and the means for extending and retracting the sleeve will be described in due course.

For supporting the distributor elbow, rotatable subframe 40 is provided including a cylindrical post 41 which extends upwardly through a bearing sleeve 42 in the manifold plate 12. An annular thrust bearing 43 is secured to the post causing the weight of the rotatable assembly to be borne by the manifold plate. At the upper end of the post 41 there is a U-shaped yoke 44 having a pair of side members 45 which straddle the elbow, being secured thereto by bolts as seen in FIGS. 8 and 9. At the lower end of the post 41 is sheave 47 about which is trained a belt 48 which leads to a remote control station (FIG. 11) and which serves both to rotate the sheave and to indicate its angular position.

In accordance with the present invention a closure disc is keyed to the post and elbow for rotation therewith and superimposed on the manifold plate, the closure disc having a single window registering with the elbow. The closure disc is dimensioned to extend over all of the inactive discharge openings and is of weighty construction so that when seated on the gaskets 29 on the manifold plate the disc serves as a fire stop in the face of an explosion either at the inlet or in any one of the connected downspouts. Thus, referring to the drawings, and particularly to FIGS. 2 and 4, there is provided a disc 50 formed of heavy gauge steel and which has a central collar 51 through which the supporting post 41 extends and to which it is keyed by a cross bolt 52 registering with the post and vertical slot 53 formed in the collar. The disc has a window opening 55 which provides passage for the distributor sleeve as it delivers grain to the registering downspout, but the disc otherwise presents a continuous undersurface serving as a closure for all of the inactive downspouts.

For the purpose of keeping the sleeve 35 of the distributor elbow registered with the window the disc has, surrounding the window, a pair of parallel reinforcing guide members 56, 57 forming, with cross members 58, 59, a recess of picture frame shape dimensioned to accept locator plate 38 adjacent the lower end of the sleeve. The cross member 59 is preferably in the form of angle iron welded bridgingly across the parallel guide members 56, 57, and which serves as a ramp to support the sleeve in its longitudinal movement. It will be seen, then, that the assembly consisting of the distributor elbow and the disc is rotated in unison upon rotation of the supporting post by its sheave 47.

In accordance with the present invention an anti-friction assembly is interposed between the mated closure disc and manifold plate, the anti-friction assembly including a way surface on one of the mated members and radially oriented roller bearings on the other. More specifically the manifold plate is formed with flat way surfaces which are segmented, with the segments being separated by shallow notches formed between them, the disc being vertically movable and having roller bearings at the periphery so spaced that the bearings drop into respective notches with detent action as the window in the disc moves into register with a selected discharge opening. Thus, referring to FIGS. 3-6 a way surface 60 is provided on the manifold plate centered about the central axis 15 and made up of arcuate strips 61 welded to the plate defining shallow notches 62 between them, the notches being eight in total number and, in the present instance, aligned with respective discharge openings. Cooperating with the way surfaces and notches on the manifold plate and mounted at the edge of the closure disc are roller bearings 64 which are four in number equally spaced about the periphery, and which have axes which are all radially oriented. Each bearing 64 is mounted in a receiving opening 65 bridged by an axle 66. While the bearings 64 are referred to as "roller" bearings, this refers to the rolling function as the bearing moves peripherally along the way surface, and the bearings may, in fact, be of the conventional ball type. The bearings 64, which are spaced to seat simultaneously in respective shallow notches 62, serve as detents for automatic accurate location of the distributor elbow, and closure disc, with respect to any selected one of the discharge openings.

In accordance with one of the important aspects of the present invention means under the control of an operator are provided for simultaneously retracting the sleeve on the distributor elbow and raising the closure disc with respect to the manifold plate. This lifts the bearings on the disc out of the notches on the plate and frees the disc from its seated, highly frictional, engagement with the gaskets 29, thereby to facilitate rotating the elbow and disc assembly to a new position.

Attention will be given first to the retraction of the sleeve 35. As set forth in FIG. 2 and as supplemented by FIGS. 7-9, this is accomplished by a linkage 70 having a pair of levers 71 of the first class which are pivoted on shoulder bolts 72 mounting the respective side members 45 and the elbow. Each of the levers 71 carries a pivot 73 at its outer end connected to a drop link 74 which is pivotally connected, at 75, to the side wall of the sleeve 35. The sleeve is biased downwardly by gravity and, in addition, is biased by a coil spring 76 which is anchored at one end 77 to the elbow and which is connected at the other end 78 to the levers. The force of downward bias is overcome by means of an operator including a cable 79 which leads through an opening 79' in the hollow post 41 to a remote control station to be discussed.

In carrying out the invention, the same levers 71 which raise the sleeve are also utilized to raise the closure disc 50 thereby lifting the bearings 64 out of the notches 62 and unseating the disc from the plate. For connecting the lever 71 shown in FIGS. 2 and 7 to the reinforcing members 56 and 57 for elevating the disc, a cable assembly 80 is used which is in the form of an inverted "Y" having a central leg 81 and downwardly angled legs 82, 83. The central leg is connected to an eye 84 on a lever located a short distance to the left of the pivot 72 while the downwardly angled legs simply are looped through openings drilled in the reinforcing guide member 57. The structure is repeated on the opposite side of the axis where lifting force is applied to the reinforcing guide member 56, with the parts of the cable being correspondingly numbered.

It will be apparent, then, that downward force applied to the operating cable 79 rotates both of the levers 71 clockwise in a direction to retract the sleeve 35 and, simultaneously, to lift the cable assemblies 80, thereby elevating the closure disc a short distance. As a result the bearings 64 are drawn out of their registering notches and the disc is clear of frictional drag with respect to the gaskets 29 as shown in FIG. 7. The disc is preferably raised just enough so that the roller bearings 64 are at the level of the way surfaces, so that the rollers, during the swinging movement, support at least a portion of the weight and have a steadying influence as the disc and elbow are rotated to a new position.

In accordance with one of the aspects of the present invention a locking device is provided for holding the sleeve 35 in its downwardly extended position and the initial movement of the operating cable is utilized for releasing the locking device in advance of retraction of the sleeve. For understanding the construction of the locking device reference is made to FIGS. 2 and 7-9. Herein the locking assembly, generally indicated at 90 includes a pivoted blocking member 91 arranged in the plane of the lever 71 and having a central pivot 92 which is mounted on the side member 45 of the supporting yoke. The blocking member 91 has a blocking surface 93 at its lower end which is interposed in the path of upward movement of the lever, preventing the sleeve 35 from being retracted, thereby locking the sleeve in its extended position. The blocking surface 93 is at such radius as to put the blocking member substantially on deadcenter when it is in its locking position.

In carrying out the invention a lost motion connection is provided between the operating cable 79 and the levers 71, with the lost motion being utilized to swing the blocking member 91 out of its blocking position during initial movement of the cable. This is accomplished by providing, on each of the levers 71, an extension 71a which is pivoted to the lever 71 by a pivot 72a, with the lost motion being limited by a pin-and-slot connection 73a between the lever and its extension. The lower end of the spring 76 is connected to the lever extensions 71a by hooking its end 78 onto a cross member 74a which extends bridgingly between them.

A releasing link 95 is pivoted at its right-hand end, at 96, to the lever extension 71a and at its left-hand end, at 97, to the upper end of the blocking member 91. It will be understood that the lock structure is preferably duplicated on each side of the elbow 30.

The effect of taking up the lost motion between the levers and their extensions is illustrated in FIG. 2. Here it will be noted that initial movement of the cable 79, acting against the force of the return spring 76, causes the lever extension 71a to rock through a slight angle with respect to the lever 71. This rocking movement, as indicated by the phantom lines, draws the release link 95 to the right, rotating the blocking member 91 clockwise to the out-of-the-way position. With the blocking member out of its blocking position, continued traction applied to the cable 79 causes clockwise rotation of the lever 71 producing the retraction of the sleeve 35 and simultaneous elevation of the disc 50 by means of the cable assembly 80, as previously discussed.

This places the mechanism in the condition illustrated in FIG. 7 in readiness for rotation of the elbow and disc to a new discharge position.

For the purpose of controlling the operation of the device at a more conveniently located position, a remote control station 100 is set up as shown diagrammatically in FIG. 11. Here the operating cable 79 after passing around two pulleys 101, 102, is connected to a foot treadle 103 capable, in a practical case, of applying approximately a six inch stroke. The selector belt 48, which is trained about sheave 47 at the bottom of the post 41, after passing around intermediate guide pulleys (not shown), engages a second sheave 105 which drives a vertical shaft 106 operated by a hand wheel 107. The shaft carries a pointer 108 which cooperates with a fixed eight-point circular reference scale 109. The scale 109 is provided with spaced index markings corresponding to the positions of the discharge openings 21-28 (FIG. 3), respectively.

Operation at the control station is simplicity itself. It will be assumed that the device is in an initial condition as set forth in FIG. 2, with the elbow 30 registering with the first discharge opening 21, with the sleeve 35 thereon in extended condition, and with the closure disc 50 fully seated. Pressure is first applied to the foot treadle 103 which draws in the operating cable 79. Initial movement of the cable rocks the lever extension 71a downwardly, taking up the lost motion at 73a and pulling the release link 95 to the right to rotate the blocking member 91 out of its blocking position (FIG. 2 phantom line). Continued traction on the cable 79, rocks the levers 71, one on each side of the elbow, clockwise to retract the sleeve 35. The closure disc is simultaneously raised by the cable assemblies 80 elevating the roller bearings 64 out of their notches 62 so that, with the treadle fully depressed, the device is in the condition illustrated in FIG. 7.

As the hand wheel 107 is rotated out of its initial position, the bearings engage the way surfaces 60 and therefore serve to support and steady the disc 50 as it rotates into a new discharge position. When the pointer 108 indicates the desired position, at least approximately, with the new position being sensed, in addition, by the "feel" of the controls, the foot treadle 103 is released. This relaxes the cable 79 so that the levers 71 rock in the counterclockwise direction under the force of gravity and the force of the return spring 76 to lower the closure disc. During such lowering the roller bearings 64 on the edge thereof settle into the bottoms of respective notches 62 in the way surface 60 (FIG. 6), thereby accurately positioning the distributor elbow so that the sleeve 35, as it simultaneously extends, is in a precise position of register with respect to the discharge opening with which it is engaged. The gaskets 29 surrounding each of the discharge openings are sufficiently thick so that the closure plate rests upon them, to form individual seals, when the roller bearings are registered with respective notches.

While it is convenient to operate the operator cable 79 and selector belt 48 manually, as described, it will be understood that the invention is not limited to this and conventional power assist, or servo, mechanisms under manual control, well known in the art, may be utilized.

The fire stop system which has been incorporated in the distributor provides a high degree of security. In the first place the disclosed arrangement provides an efficient dust stop preventing circulation of dust between the inactive downspouts which are coupled to the distributor and by means of which an explosion may be propogated. In the event of an explosion or fire in the elevator, which discharges into the inlet tube 14 at the top of the housing, the sleeve 35 at the end of the distributor elbow, because it is locked in place, will remain in its extended position and flame will not escape into the distributor housing. Even more important, is the fact that an explosion originating in any one of the inactive downspouts will be blocked by the closure disc and thus be prevented from traveling down one or all of the other inactive downspouts. Because the closure disc 50 is made of heavy metal plate, it may be expected that the disc will remain seated and that all the discharge openings will remain sealed. However, in the event of an explosion of exceptional violence in one of the inactive downspouts sufficient to lift the closure disc to produce at least partial venting into the housing, the force of the explosion within the housing is quickly vented and dissipated by slight lifting of a venting, or access, door 110 which is swingable about its upper edge upon a hinge 111 (FIG. 2). The door 110 is made of steel and, being oriented at an angle, is gravity biased into closed position. Tests show that even where the closure disc 50 may be momentarily unseated venting of the housing occurs sufficiently promptly that there is no risk that the explosion will travel down another one of the inactive spouts.

In the above described embodiment of the invention as shown in FIG. 7 a lifting connection is formed of a pair of cable assemblies 80 connected between the levers 71 and the closure disc 50 for raising the same prior to rotation with reliance upon the weight of the disc to hold the disc in a seated condition against the distributor discharge openings when force on the cable assembly is released. Study shows that where the disc is made of heavy metal plate, for example either steel or aluminum, but preferably the former, the weight is sufficient to keep the disc substantially in place, as a fire stop, in the face of an explosion, the disc being held down in addition by stop 91 via sleeve 35. However, in accordance with one of the aspects of the invention, reliance need not be placed upon weight, and the cable assemblies 80, employed for lifting purposes in the previous embodiment, may be replaced by positive hold-down linkages. Thus as shown in FIG. 10, which shows a modification of FIG. 2 and where corresponding reference numerals are employed with the addition of subscript "a", the cable assembly 80 is replaced by a more "rigid" holddown 80a formed of a drop link 81a and two angled links 82a, 83a, respectively. As a result, when the lever 71 is locked in the counterclockwise direction by the pivoted blocking member 91, as seen in FIG. 2, the blocking member exerts a downward bracing force against the links 81a-83a to hold the disc 50a positively in its downwardly seated position. Subsequently, when the levers 71a are rocked by the operator in the clockwise direction, the force upon the links is reversed and the disc 50a is raised, for turning freedom, just as in the case where lift cables are employed.

In the preferred form of the invention, described above, a flat, i.e., planar, manifold plate 12 is used with a correspondingly flat closure disc 50. It will be understood, however, that the invention is not limited to use of a flat disc and is equally applicable to a construction in which the manifold plate has a conical surface and cooperates with a disc of conical shape. Such construction is shown in FIG. 12 in which corresponding elements are identified by reference numerals corresponding to FIG. 2 with addition of subscript "b". The construction is similar to that previously described with the exception that the manifold plate 12 and its mated closure disc 50, instead of being flat or planar are dished or conical in shape. Thus the manifold plate 12b, in addition to having a flat central portion has an upwardly angled conical portion 12b' which may, in a practical case, extend upwardly at an angle of 45-60 degrees. Superimposed above the manifold plate is a closure disc 50b which has a peripheral portion 50b' which is angled upwardly at the same angle as the manifold plate and which is nestingly received within it. As in the previous embodiment, the disc is supported by means of cable assemblies 80b which, in the relaxed state, allow the conical disc 50b to settle into a seated position in which all of the inactive discharge openings are sealed off. However, when an upward force is applied to the cable assemblies by the operator, the conical disc 50b is lifted clear of the gaskets surrounding the discharge openings so that the disc and its distributor elbow may be freely swung to a new position.

When the distributor elbow and closure disc have been rotated to a new position, releasing the force on the operating cable 79b permits the levers 71b to rock counterclockwise (as viewed in FIG. 12) to extend the sleeve 35b and to release the supporting cable 80b for seating in the new position.

It was a feature of the original embodiment that positive hold-down of the disc was optionally provided as set forth in FIG. 10. In the embodiment of FIG. 12, because of the upward angling at the periphery of the manifold plate and disc, the force of an explosion in one of the downspouts is divided into two components, horizontal and vertical. This substantially reduces the vertical force on the disc so that, as a practical matter, there is less incentive to use the positive hold-down feature. While the term "disc" has been used in a generic sense to apply to both the flat disc 50 in the first embodiment and the dished, or conical, disc 50b in the second, use of the term "disc" does not preclude the possibility of providing a central opening therein to form an annulus. Moroever, the term "horizontal" as applied to the manifold plate shall, in the second embodiment of the invention, be understood to apply to its general orientation notwithstanding its conical periphery.

While in the preferred form of the invention, extension and retraction of the distributor sleeve, the locking in extended position with subsequent unlocking, and the raising, lowering and detenting of the rotatable closure disc all combine to produce an optimized structure, it is understood that the invention resides, in a broader aspect, in some of the individual features of construction. For example, the rotatable closure disc may be employed for fire stop purposes with a rotatable elbow but without the locking feature, if desired, or even without utilizing the sleeve extension feature. Also while the auxiliary means for lifting the closure disc by cables or the like reduces the force required to rotate the hand wheel, such auxiliary lifting is not essential if the notches which receive the bearing detents are made of shallow depth or omitted entirely.

Considering the damage done by recent grain elevator explosions, it is difficult to overstate, in monetary terms, the value of the safety features provided by the present invention. Nonetheless, the structure will be seen to be both simple and economical and to present no maintenance problems, requiring only casual cleaning and lubrication.

The terms "sheave" and "belt" applicable to elements 47, 48 in the selector mechanism will be understood to be used in the generic sense to include equivalents such as a sprocket and roller chain.

What we claim is:

1. In a grain distributor assembly for a grain elevator, the combination comprising a frame including a horizontal manifold plate having a plurality of discharge openings arranged in a circle at a radius about a central axis, each opening having a land surface encircling the same and each opening having an associated downspout connection under the plate, a closure disc superimposed on the manifold plate and having a single window therein located at the same radius for registering with one of the discharge openings for communication with an active downspout, a distributor elbow having an inlet at its upper end arranged coaxially with the central axis and having an outlet at its lower end terminating at the window in the disc, means for feeding grain into the upper end of the elbow for discharge through the registering discharge opening into the active downspout, the land surfaces all being arranged adjacent and parallel to the closure disc so that the inactive non-registering ones of the discharge openings are covered by the closure disc, and selector means for swinging the closure disc and elbow horizontally in unison about the central axis for positioning the elbow and window in angular register with a selected one of the discharge openings while maintaining all of the other such openings covered, the weight of the disc being supported on the land surfaces for sealing off the non-registering ones of the openings, the disc being made of metal and sufficiently weighty so that it remains in position to serve as a fire stop in the face of an explosion either at the distributor inlet or in an inactive one of the downspouts.

2. In a grain distributor assembly for a grain elevator, the combination comprising a frame including a horizontal manifold plate having a plurality of discharge openings arranged in a circle at a radius about a central axis with each opening having an associated downspout connection under the plate, a closure disc seated on the manifold plate and having a single window therein located at the same radius for registering with one of the discharge openings for communication with an active downspout, a distributor elbow having an inlet at its upper end arranged coaxially with the central axis and having an outlet at its lower end terminating at the window in the disc, means for feeding grain into the upper end of the elbow for discharge through the registering discharge opening into the active downspout while the inactive non-registering ones of the discharge openings are covered by the seated closure disc, means for pivoting the disc for swinging movement about the central axis, means including an operator for temporarily elevating the disc to disengage it from a seated position on the manifold plate and to provide freedom for swinging movement until subsequent lowering back to seated position, and selector means for swinging the closure disc and elbow horizontally in unison about the central axis for positioning the elbow and window in angular register with a selected one of the discharge openings with the subsequent lowering serving to restore the disc to its seated position in which it maintains all of the other such openings securely covered, the disc being made of metal and sufficiently weighty so that it remains in seated position to serve as a fire stop in the face of an explosion either at the distributor inlet or in an inactive one of the downspouts.

3. In a grain distributor assembly for a grain elevator, the combination comprising a frame including a horizontal manifold plate having a plurality of discharge openings arranged in a circle at a radius about a central axis with each opening having an associated downspout connection under the plate, a closure disc superimposed on the manifold plate and having a single window therein located at the same radius for registering with one of the discharge openings for communication with an active downspout, a distributor elbow having an inlet at its upper end arranged coaxially with the central axis and having an outlet at its lower end terminating at the window in the disc, means for feeding grain into the upper end of the elbow for discharge through the registering discharge opening in the active downspout while the inactive non-registering ones of the discharge openings are covered by the closure disc, selector means for swinging the closure disc and elbow horizontally in unison about the central axis for positioning the elbow and window in angular register with a selected one of the discharge openings while maintaining all of the other such openings tightly covered, the disc being made of metal and sufficiently weighty so that it remains in position to serve as a fire stop in the event of an explosion either at the distributor inlet or in an inactive one of the downspouts, a circular way surface on the manifold plate and centered with respect thereto, peripherally spaced anti-friction bearings on the disc for riding on the way surface for supporting the disc during the swinging movement thereof, and detent means interposed between the disc and the manifold plate to facilitate centering of the window in the closure disc with respect to any selected one of the discharge openings.

4. The combination as claimed in claim 3 in which the circular way surface has spaced notches formed therein at a spacing which corresponds to the spacing of the anti-friction bearings, the detent means being formed by the anti-friction bearings dropping into register with respective notches.

5. In a grain distributor assembly for a grain elevator, the combination comprising a frame including a horizontal manifold plate having a plurality of discharge openings arranged in a circle at a radius about a central axis with each opening having an associated downspout connection under the plate, a closure disc mated with the manifold plate and having a single window therein located at the same radius for registering with one of the discharge openings for communication with an active downspout, a distributor elbow having an inlet at its upper end arranged coaxially with the central axis and having an outlet at its lower end terminating at the window in the disc, means for feeding grain into the upper end of the elbow for discharge through the registering discharge opening while the inactive non-registering ones of the discharge openings are all covered by the closure disc, selector means for swinging the closure disc and elbow in unison about the central axis for positioning the elbow and window in angular register with a selected one of the discharge openings while maintaining all of the other such openings covered, the disc being vertically movable with respect to the frame but made of metal and sufficiently weighty so that it remains in seated position to serve as a fire stop in the event of an explosion either at the distributor inlet or in an inactive one of the downspouts, an anti-friction assembly interposed between the mated closure disc and manifold plate, the anti-friction assembly including circular segmented way surfaces on one of the mated members and radially oriented roller bearings on the other, the segments of the way surfaces being separated by shallow notches formed between them, the radially oriented roller bearings being positioned for riding on the way surfaces for supporting the closure disc during its swinging movement as the window and elbow move from one discharge opening to another, the notches and bearings being so spaced that the bearings drop into respective notches with detent action as the window in the disc moves into register with the selected discharge opening for accurate centering of the window over the selected opening, and means for elevating the disc to move the bearings out of the shallow notches for a successive swinging movement of the disc and elbow to a new discharge position.

6. In a grain distributor assembly for a grain elevator, the combination comprising a frame including a horizontal manifold plate having a plurality of discharge openings arranged in a circle at a radius about a central axis with each opening having an associated downspout connection under the plate, a closure disc superimposed on the manifold plate and having a single window therein located at the same radius for registering with one of the discharge openings, a distributor elbow having an inlet at its upper end arranged coaxially with the central axis and having an outlet at its lower end terminating at the window in the disc, means for feeding grain into the upper end of the elbow for discharge through the registering discharge opening while the inactive non-registering ones of the discharge openings are all covered by the closure disc, selector means for swinging the closure disc and elbow in unison about the central axis for positioning the elbow and window in angular register with a selected one of the discharge openings while maintaining all of the other such openings covered, the disc being vertically movable with respect to the frame but made of metal and sufficiently weighty so that it remains in seated position to serve as a fire stop in the event of an explosion either at the distributor inlet or in the inactive one of the downspouts, circular segmented way surfaces on the manifold plate extending between the angular positions of the discharge openings, the way surfaces being separated by shallow notches, radially oriented roller bearings on the closure disc positioned for riding on the way surfaces for supporting the closure disc during its swinging movement as the window and elbow move from one discharge opening to another, the notches and bearings being so spaced that the bearings drop into respective notches as the window in the disc moves into register with the selected discharge opening for accurate centering of the window over the selected opening, and means including an operator for elevating the disc to move the bearings out of the shallow notches for a successive swinging movement of the disc and elbow to a new discharge position.

7. In a grain distributor assembly for a grain elevator, the combination comprising a frame including a horizontal manifold plate having a plurality of discharge openings arranged in a circle at a radius about a central axis with each opening having an associated downspout connection under the plate, a closure disc superimposed upon the manifold plate and having a single window therein located at the same radius for registering with one of the discharge openings, a distributor elbow having an inlet at its upper end arranged coaxially with the central axis and having an outlet at its lower end aligned with the window, selector means for swinging the disc and elbow about the central axis, a sleeve in telescoping relation with the lower end of the elbow movable between a retracted position in which the sleeve is withdrawn from the window and a downwardly extended position in which the sleeve extends through the window and into the registering discharge opening so that grain fed into the upper end of the elbow is discharged through the associated downspout, means for biasing the sleeve into its extended position, means including an operator for overcoming the bias and moving the sleeve to its retracted position to permit swinging the closure disc and elbow in unison about the central axis to position the elbow and window in angular register with another at one of the selected discharge openings while maintaining all of the other such openings securely covered.

8. In a grain distributor assembly for a grain elevator, the combination comprising a frame including a horizontal manifold plate having a plurality of discharge openings arranged in a circle at a radius about a central axis with each opening having an associated downspout connection under the plate, a closure disc superimposed upon the manifold plate and having a single window therein located at the same radius for registering with one of the discharge openings, a distributor elbow having an inlet at its upper end arranged coaxially with the central axis and having an outlet at its lower end aligned with the window, selector means for swinging the disc and elbow around the central axis, a sleeve in telescoping relation with the lower end of the elbow movable between a retracted position in which the sleeve is withdrawn from the window and a downwardly extended position in which the sleeve extends through the window and into the registering discharge opening so that grain fed into the upper end of the elbow is discharged through the associated downspout, means for locking the sleeve in its extended position, means including an operator for releasing the lock and moving the sleeve to its retracted position to permit swinging the closure disc and elbow in unison about the central axis to position the elbow and window in angular register with another at one of the selected discharge openings while maintaining all of the other such openings securely covered.

9. The combination as claimed in claim 8 in which means are provided responsive to the initial movement of the operator in the retracting direction for releasing the lock.

10. The combination as claimed in claim 8 in which the operator is connected via a lost motion connection to the sleeve for retracting the same, the lock being in the form of a blocking member arranged effectively in the path of movement of the sleeve for preventing the retracting movement thereby locking the sleeve in extended position, the actuator being directly coupled to the blocking member so that when the operator is actuated the blocking member is first moved out of its blocking position followed sequentially by retraction of the sleeve.

11. The combination as claimed in claim 8 in which a lever fulcrumed on the elbow is connected to the sleeve for retracting the same, a pivoted blocking member arranged in the path of movement of the lever and having a deadcenter condition for preventing the retracting movement thereby locking the sleeve in its extended position, the operator being in the form of a manual actuator coupled to the blocking member and to the lever via separate connections for sequentially (a) rocking the blocking member out of its dead center condition and (b) rocking the lever to retract the sleeve.

12. The combination as claimed in claim 8 in which a lever fulcrumed to the elbow is connected to the sleeve for retracting the same, a blocking member secured to the elbow and interposed in the path of movement of the lever for blocking the same in a direction to lock the lever in the sleeve-extending position, the operator including a cable, the cable being directly connected to the blocking member and a lost motion connection being interposed between the cable and the lever so that when the cable is pulled the initial movement of the cable unblocks the lever and continued movement of the cable rocks the lever to its sleeve retracting position.

13. In a grain distributor assembly for a grain elevator, the combination comprising a frame including a horizontal manifold plate having a plurality of discharge opening arranged in a circle at a radius about a central axis with each opening having an associated downspout connection under the plate, a closure disc superimposed on the manifold plate and having a single window therein located at the same radius for registering with one of the discharge openings, a distributor elbow having an inlet at its upper end arranged coaxially with the central axis and having an outlet at its lower end, a sleeve in telescoping relation to the lower end of the discharge elbow and movable between (a) an extended position in which the sleeve extends through the window and into the registering discharge opening and (b) a retracted position in which the sleeve is drawn upwardly free of the discharge opening, selector means for swinging the closure disc and elbow in unison about the central axis for positioning the elbow and window in angular register with a selected one of the discharge openings while maintaining all of the other such openings covered, the disc being vertically movable through a limited distance with respect to the frame, the disc being made of metal and sufficiently weighty so that it remains in a seated position to serve as a fire stop in the face of an explosion either at the distributor inlet or in an inactive one of the downspouts, and means including an operator for simultaneously retracting the sleeve and for raising the closure disc clear of the manifold plate to facilitate swinging of the disc and elbow to a new position.

14. In a grain distributor assembly for grain elevator, the combination comprising frame including a horizontal manifold plate having a plurality of discharge openings arranged in a circle at a radius about a central axis with each opening having an associated downspout connection under the plate, a distributor elbow above the manifold plate having an inlet at its upper end arranged coaxially with the central axis and having an outlet at its lower end, selector means for mounting the elbow for horizontal swinging movement for discharge into any selected one of the discharge openings, a closure disc secured to the elbow for rotation therewith and superimposed on the manifold plate, the closure disc having a single window registering with the elbow, the disc being dimensioned to extend over all of the inactive discharge openings and of weighty construction to serve as a fire stop in the face of an explosion either at the distributor inlet or in an inactive one of the downspouts, a sleeve in telescoping relation to the lower end of the discharge elbow movable between an extended position in which the sleeve extends through the window and into the registering discharge opening and a retracted position in which the sleeve is drawn upwardly free of the discharge opening, a locking device for locking the sleeve in its extended position, and means including an operator movable between a released position and an actuated position for (a) releasing the locking device, (b) retracting the sleeve and (c) raising the disc clear of the manifold plate to facilitate swinging of the disc and elbow to a new position by the selector means.

15. In a grain distributor assembly for a grain elevator, the combination comprising a frame including a horizontal manifold plate having a plurality of discharge openings arranged in a circle at a radius about a central axis with each opening having an associated downspout connection under the plate, a closure disc superimposed upon the manifold plate and having a single window therein located at the same radius for registering with one of the discharge openings, a distributor elbow having an inlet at its upper end arranged coaxially with the central axis and having an outlet at its lower end, a sleeve telescoped over the lower end of the elbow and movable between (a) an extended position in which the sleeve extends downwardly through the window and into the registering discharge opening and (b) an upwardly retracted position in which the sleeve is clear of the discharge opening, selector means selector means for swinging the closure disc and elbow in unison about the central axis for positioning the elbow and window in angular register with a selected one of the discharge openings while maintaining all of the other such openings covered, the disc being vertically movable through a small distance, the disc being made of metal and sufficiently weighty so that it remains in position to serve as a fire stop in the face of an explosion either at the distributor inlet or in an inactive one of the downspouts, a segmented annular way surface concentrically located on the manifold plate, the segments being separated by shallow notches, radially oriented roller bearings spaced at equal intervals about the closure disc for supporting the disc as it rotates between successive angular positions, the notches and roller bearings being so spaced that the dropping of the roller bearings into respective notches serves as a detent to define a condition of register between the elbow and window and any selected one of the discharge openings, and means including an operator coupled to the sleeve and coupled to the closure disc for simultaneously retracting the sleeve and raising the closure disc so that the bearings thereon are clear of the notches in readiness for angular movement of the disc and elbow to a new position.

16. In a grain distributor assembly for a grain elevator, the combination comprising a frame including a horizontal manifold plate having a plurality of discharge openings arranged in a circle at a radius about a central axis with each opening having an associated downspout connection under the plate, a closure disc seated on the manifold plate and having a single window therein located at the same radius for registering with one of the discharge openings for communication with an active downspout, a distributor elbow having an inlet at its upper end arranged coaxially with the central axis and having an outlet at its lower end terminating at the window in the disc, means for feeding grain into the upper end of the elbow for discharge through the registering discharge opening into the active downspout while the inactive non-registering ones of the discharge openings are covered by the seated closure disc, means for pivoting the disc for swinging movement about the central axis, means including an operator movable from a released condition to an actuated condition for elevating the disc to disengage it from its seated condition on the manifold plate and to provide freedom for swinging movement, and selector means for swinging the disengaged closure disc and elbow horizontally in unison about the central axis for positioning the elbow and window in angular register with a selected one of the discharge openings with movement of the operator from its actuated condition to its released condition serving to restore the disc to its seated condition in which it maintains all of the other such openings securely covered, positive hold-down means for holding the disc in its seated condition, and means coupled to the operator for activating the holddown means as long as the operator is in its released condition so that the disc serves as a positive first stop in the face of an explosion either at the distributor inlet or in an inactive one of the downspouts.

17. In a grain distributor assembly for grain elevator, the combination comprising a frame including a horizontal manifold plate having a plurality of discharge openings arranged in a circle at a radius about a central axis with each opening having an associated downspout connection under the plate, a distributor elbow above the manifold plate having an inlet at its upper end arranged coaxially with the central axis and having an outlet at its lower end, selector means for mounting the elbow for horizontal swinging movement for discharge into any selected one of the discharge openings, a closure disc secured to the elbow for rotation therewith and seated on the manifold plate, the closure disc having a single window registering with the elbow, the disc being dimensioned to extend over all of the inactive discharge openings to serve as a fire stop in the face of an explosion either at the distributor inlet or in an inactive one of the downspouts, a sleeve in telescoping relation to the lower end of the discharge elbow movable between an extended position in which the sleeve extends through the window and into the registering discharge opening and a retracted position in which the sleeve is drawn upwardly free of the discharge opening, means including a locking device for positively holding down the sleeve in extended position and for positively holding down the disc in its seated condition, and means including an operator movable from a released position to an actuated position for (a) releasing the locking device, (b) retracting the sleeve and (c) raising the disc clear of the manifold plate to facilitate swinging of the disc and elbow to a new position by the selector means.

18. In a grain distributor assembly for grain elevator, the combination comprising a frame including a horizontal manifold plate having a plurality of discharge openings arranged in a circle at a radius about a central axis with each opening having an associated downspout connection under the plate, a distributor elbow above the manifold plate having an inlet at its upper end arranged coaxially with the central axis and having an outlet at its lower end, selector means for mounting the elbow for horizontal swinging movement for discharge into any selected one of the discharge openings, a closure disc secured to the elbow for rotation therewith and superimposed on the manifold plate, the closure disc having a single window registering with the elbow, the disc being dimensioned to extend over and close off all of the inactive discharge openings, the disc being vertically movable through a small distance from a downwardly seated condition to an upraised condition clear of the manifold plate to facilitate swinging of the disc and elbow to a new position by the selector means, means including a blocking member for normally locking the disc in its downwardly seated condition so that the disc serves as a fire stop in the face of an explosion either at the distributor inlet or in an inactive one of the downspouts, and means including an operator for (a) releasing the locking means and (b) raising the disc clear of the manifold plate.

19. The combination as claimed in claim 1 or in claim 2 or in claim 3 or in claim 5 or in claim 6 or in claim 13 or in claim 14 or in claim 15 in which the manifold and disc are of dished shape having mating conical peripheries.

* * * * *